United States Patent Office 3,753,932
Patented Aug. 21, 1973

3,753,932
PROCESS FOR PREPARING MICROPOROUS OPEN-CELLED CELLULAR POLYMERIC STRUCTURES
Francis Edward Jenkins, Wilmington, Del., assignor to E. I. du Pont de Nemours and Company, Wilmington, Del.
No Drawing. Filed Dec. 23, 1970, Ser. No. 101,181
Int. Cl. C08f 47/10; C08j 1/26
U.S. Cl. 260—2.5 R
37 Claims

ABSTRACT OF THE DISCLOSURE

A process for preparing microporous open-celled cellular polymeric structures which comprises (a) dissolving the starting polymer in a chlorofluorocarbon solvent; (b) cooling the resulting solution to at least the solidification temperature of the chlorofluorocarbon solvent; and (c) removing the chlorofluorocarbon solvent from the solidified solution at a temperature equal to or lower than the solidification temperature of said chlorofluorocarbon.

BACKGROUND OF THE INVENTION

Field of the invention

This invention relates to a novel process for preparing microporous cellular polymeric structures and more particularly to a process for preparing open-celled microporous cellular structures of polymers in the presence of selected chlorofluorocarbons or chlorofluorocarbons and adjuvant.

Prior art

Cellular polymeric structures are well known in the art and have found extensive use as insulating, construction, packaging materials and the like. Such cellular structures have been made from a variety of polymers, including polyurethanes, polystyrene, cellulose esters, and polyvinyl chloride.

A number of methods are available for the preparation of polymeric cellular structures. In one method, a molten thermoplastic polymeric material is thoroughly mixed with a gas or a volatile liquid at atmospheric pressure, and the mixture is heated in a closed chamber under pressure. The hot mixture is then released from the closed chamber through a suitable die or opening thus subjecting the hot mixture to the reduced pressure of the atmosphere causing the gas or the low boiling liquid to expand and volatilize, leaving a permanent cellular structure on cooling.

A second method, particularly applicable to the formation of polyurethane cellular structures, utilizes the heat of polymerization to create a cellular structure. In this "one-shot" technique, polyisocyanate, polyhydroxyl compounds, polymerization catalysts (e.g. amines) and blowing agents (e.g. $CCl_3F$, $CCl_2F_2$) are combined. As polyurethane formation takes place, the heat of polymerization causes the blowing agent to expand and volatize leaving behind a cellular polyurethane structure.

In another method, molten thermoplastic polymer is thoroughly mixed with solids of finite size which after cooling are subsequently extracted from the polymer mass with selected solvents, leaving behind a cellular structure.

There are, however, various disadvantages manifested by these processes. Some processes, for instance, are suitable only for thermoplastic polymers which are stable in the molten state while others are applicable only to those condensation polymerization reactions which can be controlled—such technique cannot, for example be generally used with those polymers which are formed by addition polymerization. The most apparent limitation of the prior art methods of forming cellular structure is the inability of each method to provide a broad variety of shapes of cellular materials.

The cellular material prepared by the above methods may be either closed-celled or open-celled depending on the particular process utilized. Closed-celled structures contain individual cells whose size and cell wall thickness depend upon such factors as molecular weight of the polymer, type of blowing agent used, and the density of the final cellular material. The open-celled structure does not contain individual cells but is characterized by the presence of interconnecting channels throughout the cellular structure. Closed-celled polymeric materials are especially suitable for those applications where the transmission of vapor would be undesirable, such as in thermal insulation. Open-celled polymeric materials, on the other hand, are especially suitable for those applications where transmission of vapor would be desirable. Microporous open-celled polymeric materials, such as certain polyurethanes have found acceptance as leather-like poromeric structures.

While closed-celled polymeric materials can be readily made by known methods of the art, open-celled polymeric structures are usually much more difficult to obtain. There is therefore a need for a reliable and convenient process for making open-celled polymeric materials of any desired shape and this need is satisfied by the process of the present invention.

SUMMARY OF THE INVENTION

The present invention is directed to a process for preparing microporous open-celled cellular polymeric structures.

The process comprises the following steps:

(a) At least 0.3 weight per volume percent of a normally solid polymer is dissolved in a solvent comprising liquid chlorofluorocarbon or mixture of liquid chlorofluorocarbons having a boiling point in the range of from about 10° C. to 150° C., a melting point in the range of from about −40° C. to 125° C. (melting point being lower than boiling point), an entropy of fusion of less than 10 calories/° K/mole (heat of fusion [cal./mole]/temperature of fusion [° K]), a plastic flow index of at least 0.1 g./10 min. at the reduced temperature of 0.96 to 0.99 (reduced temperature equals T° K at which flow measured/T° K of melting point; plastic flow being a measurement of the rate of extrusion as measured on a plastometer according to ASTM–D 1238–65T) and a solubility in water of less than about 2 weight percent, to form a polymer solution, (b) The resulting solution is then cooled to at least the solidification temperature of the lowest melting solvent component present to form a solidified solution; and (c) The solvent is removed from the resulting solidified solution at a temperature equal to or lower than the solidification temperature of the lowest melting chlorofluorocarbon component present.

DESCRIPTION OF THE INVENTION

In the process of this invention, a normally solid polymer having a solubility of at least 0.3% (weight/volume) is dissolved in a solvent comprising liquid chlorofluorocarbon or mixture of liquid chlorofluorocarbons having a boiling point in the range of from about 10° C. to 150° C., a melting point in the range of from about −40° C. to 125° C. (melting point being lower than boiling point), an entropy of fusion of less than 10 calories/° K/mole (heat of fusion [cal./mol]/temperature of fusion [° K]), a plastic flow index of at least 0.1 g./10 min. at the reduced temperature of 0.96 to 0.99 (reduced temperature equals T° K at which flow measured/T° K of melting point; plastic flow being a measurement of the rate of extrusion as measured on a plastometer according to ASTM–D 1238–65T) and a solubility in water of less than about 2 weight percent. Therefore, at least 0.3 weight per volume percent of the polymer is dissolved in the selected chlorofluorocarbon. The polymer is dissolved in the chlorofluorocarbon at a temperature above the solidification temperature of the chlorofluorocarbon or mixture of chlorofluorocarbons to form a polymer solution. Heating may be used advantageously to facilitate dissolution of the polymer. This heating may also be carried out under pressure.

Optionally, an additional solvent (i.e., auxiliary or adjuvant) which is miscible in the chlorofluorocarbon or mixture of chlorofluorocarbons and which assists in solubilizing the polymer in said chlorofluorocarbon or said mixture of chlorofluorocarbons may also be present in amount below that which would depress the solidification temperature of the polymer solution appreciably below the solidification temperature of the chlorofluorocarbon, e.g., more than about 5–10° C.

A polymer solution in chlorofluorocarbon solvent or chlorofluorocarbon and adjuvant solvent results and then the temperature of the said resultant solution is reduced by any art-known means to a temperature equal to or lower than the solidification temperature of the lowest melting chlorofluorocarbon present so that a plastic, malleable solidified solution is obtained. Due to the nature of the chlorofluorocarbons, which are useful in this invention, the solidification temperature of the polymer solution is usually the solidification temperature of the chlorofluorocarbon, but may be a few degrees lower when an adjuvant had been used to aid in the dissolution of the polymer. This "solidified solution" of the polymer in chlorofluorocarbon solvent or chlorofluorocarbon-adjuvant solvent is characterized as being plastic, malleable and pliable and is capable of being extruded, pressed, molded or shaped into any desired form.

The chlorofluorocarbon solvent or chlorofluorocarbon adjuvant solvent is then removed from the solidified solution at a temperature equal to or lower than the solidification temperature of the lowest melting chlorofluorocarbon solvent present (e.g., by sublimation).

While only chlorofluorocarbons are discussed herein, it is recognized that other non-chlorofluorocarbon solvents, e.g., cyclohexane, could likewise be utilized in the process of this invention; however, they lack the efficacy manifested by chlorofluorocarbons meeting the parameters set out herein.

This process as defined is a process for the preparation of a coherent microporous open-celled cellular polymeric structure whose shape and external dimensions are essentially that of the solidified solution from which it was obtained. The temperature at which the chlorofluorocarbon solvent or chlorofluorocarbon and adjuvant solvent are removed can be any temperature equal to or below the solidification temperature of the lowest melting chlorofluorocarbon present; however, for greater efficiency, a temperature slightly below the said solidification temperature is preferred, e.g., about 5–10° C.

It is also possible to prepare either coherent or particulate microporous cellular structures by slight variation in above-described process.

A normally solid polymer having a solubility of at least 0.3% (weight/volume) in a liquid chlorofluorocarbon or mixture of liquid chlorofluorocarbons having a boiling point in the range of from about 10° C. to 150° C., a melting point in the range of from about −40° C. to 125° C. (melting point being lower than boiling point), an entropy of fusion of less than 10 calories/° K/mole (heat of fusion [cal./mole]/temperature of fusion [° K]), a plastic flow index of at least 0.1 g./10 min. at the reduced temperature of 0.96 to 0.99 (reduced temperature equals T° K at which flow measured/T° K of melting point; plastic flow being a measurement of the rate of extrusion as measured on a plastometer according to ASTM–D 1238–65T) and a solubility in water of less than about 2 weight percent. Therefore, at least 0.3 weight per volume percent of the polymer is dissolved in the selected chlorofluorocarbon. The polymer is dissolved in the selected chlorofluorocarbon. The polymer is dissolved in the chlorofluorocarbon at a temperature above the solidification temperature of the chlorofluorocarbon or mixture of chlorofluorocarbons to form a polymer solution. Heating may be used advantageously to facilitate dissolution of the polymer. This heating may also be carried out under pressure.

Optionally, an additional solvent (i.e., auxiliary or adjuvant) which is miscible in the chlorofluorocarbon or mixture of chlorofluorocarbon and which assists in solubilizing the polymer in said chlorofluorocarbon or said mixture of chlorofluorocarbons may also be present in amount below that which would depress the solidification temperature of the polymer in solution appreciably below the solidification temperature of the chlorofluorocarbon, e.g., more than about 5–10° C.

A surface active agent is then dissolved in the solution in an amount to constitute less than about 1% (weight/volume) of the solution if coherent microporous open-celled cellular structure is desired or in amount to constitute greater than about 1% (weight/volume) of the solution if a particulate microporous open-celled cellular structure is desired. From a practical standpoint, use of surface active agent much over about 3% (weight/volume) of solution is not encouraged because of (1) waste of surfactant; and (2) possible gelation of the polymer solution. Therefore, if a particulate structure is desired, the amount of surface active agent utilized is preferably from about 1% to about 3% (weight/volume) of solution.

Water is then added to the polymer solution containing the surface active agent at a temperature above the solidification temperature of the highest melting component of the chlorofluorocarbon solvent or chlorofluorocarbon-adjuvant solvent present in the mixture and is agitated producing a stable liquid emulsion. The formation of the emulsion is frequently characterized by a marked increase in viscosity.

The emulsion is then cooled, by any art-known means, with continued agitation until the temperature is equal to or lower than the solidification temperature of the lowest melting chlorofluorocarbon present at which temperature a plastic, malleable and pliable mass is obtained which can be extruded, pressed, molded or shaped into any desired form.

The water and chlorofluorocarbon solvent or chlorofluorocarbon-adjuvant solvent are then removed from the plastic mass at temperature equal to or lower than the solidification temperature of the lowest melting chlorofluorocarbon present but above the solidification temperature of water, i.e., 0° C., by aspiration and vaporization, e.g., pressing the plastic mass on a Buchner funnel and applying vacuum to the back side of the filter or by passage or inert gas through the mass, microporous cellular structures are obtained. The amount of surfactant used determines whether a coherent cellular structure or a particulate cellular structure is obtained. Generally, as stated previously, if the amount of surfactant used is less than about 1% of the polymer-chlorofluorocarbon or polymer-chlorofluorocarbon adjuvant solution, a coherent microporous cellular structure which retains the shape and the dimension of the original plastic mass is obtained. On the other hand, if the amount of surfactant is about 1% or more, the microporous structure obtained is particulate, each particle having microporous cellular structure. The particulate cellular structures have the appearance of finely divided polymer powder. Each particle, however, has open cellular microporous structure.

Polymers useful in the process of this invention are those polymers which are normally solid and which are soluble in the chlorofluorocarbons previously defined and discussed below, to the extent of at least 0.3% (weight/volume) or whose dissolution therein to that level may be facilitated by the addition of a small amount of adjuvant solvent. Any polymer described as being addition, condensation, thermoplastic, thermoset, or cross-linked is useful in this invention provided that minimum solubility of at least 0.3% (weight/volume) in the chlorofluorocarbon is manifested. The minimum solubility of 0.3% (weight/volume) is specified because cellular structures obtained from polymer solution of any lower concentration would be so fragile and friable as to render such material of little value and the economics of handling such dilute solution with the attendant need to remove excessive amounts of chlorofluorocarbon solvent would be quite unfavorable. Since the void content, i.e., porosity, of the cellular structure is partially determined by the concentration of the polymer solution in the process of this invention, it is undesirable to use polymer solution whose polymer concentration is so high as to give cellular structures with a void content of, say, less than 2%. Such cellular material while still microporous and open-celled would be almost indistinguishable from the original bulk polymer in physical properties. It is therefore preferable that the polymer concentration not exceed 60–70% (w./v.). Preferred polymers from which coherent microporous open-celled cellular structures or particulate microporous structures may be made are listed in Table I.

TABLE I (1) Polystyrene
(2) Styrene-butadiene-isoprene copolymer
(3) Polyisobutylene
(4) Ethylene-propylene-diene elastomer
(5) Polyethylene
(6) Polypropylene
(7) Polychloroprene
(8) Hexafluoropropylene-vinylidenedifluoride copolymer
(9) Polyvinylacetate
(10) Eethylene-vinylacetate copolymer
(11) Polyalkyl(meth)acrylate
(12) Ethylene-methacrylic acid copolymer
(13) Vinylidene difluoride-tetrafluoroethylene-vinylbutyrate copolymer
(14) Tetrafluoroethylene-isobutylene copolymer
(15) Polyvinyl chloride
(16) Ethyl cellulose
(17) Cellulose acetate-butyrate
(18) Epoxy-polyamide
(19) Polyurethane This list of polymers includes ethylenic, diethylenic, copolymers of ethylenic and diethylenic vinyl monomers, condensation, and cellulosic polymers.

The chlorofluorocarbon solvents useful in this invention should possess following desirable characteristics: (1) a boiling point in the range of from about 10° C. to 150° C.; (2) a melting point in the range of from about —40° C. to 125° C. (melting point being lower than boiling point); (3) an entropy of fusion of less than 10 calories/° K/mole (heat of fusion [cal./mole]/temperature of fusion [° K]); (4) a plastic flow index of at least 0.1 g./10 min. at the reduced temperature of 0.96 to 0.99 (reduced temperature equals T°K at which flow measured/T°K of melting point; plastic flow being a measurement of the rate of extrusion as measured on a plastometer according to ASTM–D 1238–65T), and (5) a solubility in water of less than about 2 weight percent.

The preferred chlorofluorocarbons of this invention include 1,1,1,2,2-pentachloro-2-fluoroethane,
1,1,2,2-tetrachloro-1,2-difluoroethane,
1,1,1,2-tetrachloro-2,2-difluoroethane,
1,1,1,-trichloro-2,2,2,-trifluoroethane,
1,2-dichlorodecafluorocyclohexane,
1,1,2,2-tetrachloro-perfluorocyclobutane,
1,2-dichloroperfluorocyclobutane,
1-chloroperfluorocyclobutane,
1,1,2-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane and mixture thereof. The melting points and the boiling points of these chlorofluorocarbons are shown in Table II below.

TABLE II

| Chlorofluorocarbon | Melting point (° C.) | Boiling Point (° C.) |
|---|---|---|
| CCl₃—CCl₂F | 100 | 137 |
| CCl₂F—CCl₂F | 23.5 | 92.8 |
| CCl₃—CClF₂ | 40.6 | 91.5 |
| CCl₂F—CClF₂ | —35. | 47.6 |
| CCl₃—CF₃ | 14 | 45.7 |
| CF₃—CCl₂—CCl₂F | 41.7 | 112.4 |
| CF₃CCl₂—CClF₂ | —4.3 | 72 |
| CF₃—CCl₂—CF₃ | 3. | 33 |
| CF₃—CCl₂—CCl₂—CF₃ | 85.5 | 131–136 |
| CF₂—CF₂—CCl₂—CCl₂ (cyclic) | 84.8 | 136 |
| CF₂—CF₂—CClF—CClF (cyclic) | —15.1 | 59.9 |
| CF₂—CF₂—CF₂—CClF (cyclic) | —39.1 | 25.6 |
| CF₂—CF₂—CF₂—CF₂—CClF—CClF (cyclic) | 34 | 108 |

The chlorofluorocarbons listed above have fairly narrow liquid temperature ranges. It is also of importance that these chlorofluorocarbons, when mixed, have a solidification temperature which varies linearly with the composition of the components, i.e., a eutectic is not formed. Table III below shows the solidification temperature of mixtures of CCl₂FCCl₂F and CCl₃CCF₂, as a function of the CCl₃CClF₂ content in the mixture.

TABLE III

CCl₂FCCl₂F solvent freezing point vs. CCl₃CClF₂ content

| Wt. percent CCl₃CClF₂: | Freezing point, ° C. |
|---|---|
| 0 | 26.0 |
| 10 | 27.4 |
| 20 | 28.9 |
| 30 | 30.4 |
| 40 | 31.8 |
| 50 | 33.3 |
| 60 | 34.7 |
| 70 | 36.2 |
| 80 | 37.7 |
| 90 | 39.1 |
| 100 | 40.6 |

Thus it is possible and often advantageous to use a mixture of chlorofluorocarbons in the process of this invention. The preferred chlorofluorocarbon is 1,1,1,2-tetrachloro-2,2-difluoroethane. The preferred mixture of chlorofluorocarbon is a mixture of 1,1,1,2-tetrachloro-2,2-difluoroethane and 1,1,2,2 - tetrachloro - 1,2-difluoroethane.

The adjuvant solvents useful in the process of this invention are determined by nature of the polymer which is to be dissolved in the chlorofluorocarbon solvent. The requirements of the adjuvant solvent are that it assist in solubilizing the polymer in chlorofluorocarbon, it be miscible in chlorofluorocarbon and that it not depress the solidification temperature of the polymer solution appreciably below the solidification temperature of the chlorofluorocarbon itself, i.e., no more than from about 5–10° C.

The following adjuvant solvents are particularly useful:

(a) Camphor in facilitating dissolution of polypropylene in 1,1,1,2-tetrachloro-2,2-difluoroethane;

(b) p-Dichlorobenzene in facilitating dissolution of polypropylene in 1,1,1,2-tetrachloro-2,2-difluoroethane;

(c) Acetic acid in facilitating dissolution of ionically cross-linked ethylene-methacrylic acid copolymer in 1,1,1,2-tetrachloro-2,2-difluoroethane;

(d) Camphor in facilitating dissolution of polyvinylchloride and vinyl chloride copolymers in 1,1,1,2-tetrachloro-2,2-difluoroethane;

(e) Trioxane in facilitating dissolution of polyvinylchloride and vinyl chloride copolymers, and polyurethane in 1,1,1,2-tetrachloro-2,2-difluoroethane;

(f) Camphor in facilitating dissolution of cellulose acetate-butyrate polymer in 1,1,1,2-tetrachloro-2,2-difluoroethane; and (g) Methylethylketone in facilitating dissolution of cellulose acetate-butyrate polymer in 1,1,1,2-tetrachloro-2,2-difluoroethane.

The surface active agents useful in the modified process of this invention are well known in the art and may be selected from the following classes:

(1) Anionic surface active agents which include, for example, fatty carboxylic acids, sulfuric esters such as sulfated alcohols and olefins, alkanesulfonic acids, alkylarylsulfonic acids and the corresponding salts;

(2) Cationic surface active agents which include, for example, fatty amines and quaternary ammonium compounds; and (3) Nonionic surface active agents which are generally products in which a controlled number of ether or hydroxyl groups is introduced into a hydrophobic molecule such as, for example polyoxyalkylene ethers of higher fatty alcohols and alkylphenols.

The surface active agents to be useful in the present invention must be soluble in chlorofluorocarbon solvent.

Cellular plastic materials are, of course, well known in the art and as articles of commerce. The coherent cellular materials are referred to generally as "foams" either as flexible foam or as rigid foam depending upon the physical characteristics of the cellular material. Extensive use is made of cellular polymeric materials in such applications as in insulation (thermal, sound and electrical), structural, packaging and flotation. Cellular structures prepared by the use of blowing agents either as gas or low boiling liquid dissolved in molten polymer or by the use of solids which decompose thermally generally gaseous decomposition products are characterized as having closed cells. Generally, 90–100% of the void in cellular structures prepared by above methods are composed of closed cells, each cell containing residual blowing agent. However, there are many applications of cellular materials in which vapor transmission, made possible by open cell structure, is desirable. For example, in enclosures where humidity or internal pressures should be relieved, a portion of enclosure could advantageously be made of open-cell cellular materials.

The present invention provides a method of preparing cellular polymeric structures which are open-celled and microporous. This invention has a number of advantages over prior art methods of making cellular structures. Among these are:

(1) Excellent versatility with respect to polymers that may be used;

(2) Convenient and safe range of processing temperature such that even heat sensitive polymers (i.e., those polymers which decompose without melting) may be processed;

(3) Excellent control of void content (porosity) of cellular structures;

(4) Formation of cellular structures that are open-celled and microporous;

(5) Versatility in forming shaped cellular structures; and (6) Capability of making cellular structures with uniformly dispersed solids (pigments, metals, etc.).

A very important and valuable feature of the present invention is the solidified solution of the polymer in chlorofluorocarbon solvent or chlorofluorocarbon and adjuvant solvent which is obtained upon cooling the polymer solution to a temperature equal to or slightly below the solidification tempertaure of the lowest melting component of the chlorofluorocarbon solvent or chlorofluorocarbon-adjuvant solvent present. This solidified solution is plastic, malleable and pliable and may be (1) Extruded, molded, or shaped into any desired shape and then converted into a cellular structure which will have the shape and the dimensions of the original solidified solution;

(2) Coated on supports of various types and then converted to cellular structure thereby forming microporous, open cellular structures on supports;

(3) Layered on top of another solid solution, then converted to cellular structure thereby forming laminates of cellular structures;

(4) Milled with any finely divided solid, then converting to cellular structure thereby obtaining a cellular structure with uniformly dispersed solids; and (5) Partially oriented by shearing unidirectionally, then converting to cellular structure thereby obtaining cellular structure in which polymer is partially oriented.

While normally the process of present invention is carried out by dissolving a polymer in the chloroflorocarbon solvent or chlorofluorocarbon and adjuvant solvent, it is possible, if desired, to conduct polymerization in the solvent and thereby arrive at a solution of polymer solvent.

The process of the present invention is conveniently carried out batchwise. However, it will be readily apparent to those skilled in the art that the steps in the present invention are readily adaptable to a continuous process.

EXAMPLES

The following examples are intended to be merely illustrative of the invention and not in limitation thereof. Unless otherwise indicated, all quantities are by weight.

Example 1

Microporous open cellular polystyrene (90% void content).—A 10% (w./v.) solution was prepared by stirring 100 g. of polystyrene ("Styron" 666 molding grade pellets, Dow Chemical Co.) with 1000 ml. 1,1,1,2-tetrachloro-2,2-difluoroethane (M.P. 40.6° C., B.P. 91.5° C.) under reflux until a clear homogeneous solution was obtained. A shaped solid solution was then obtained by pouring the solution into a mold which was then cooled in an ice-water bath. After solidification, the shaped solid solution was removed from the mold and placed in a vacuum desiccator. Vacuum was applied to sublime the tetrachlorodifluoroethane away from the solid solution and after thus removing the tetrachloro difluoroethane, a white hard, coherent, microporous cellular structure of polystyrene was left behind. This structure retained the shape and the dimensions of the original shaped solid solution.

Since the chlorofluorocarbon used is insoluble in water, the solid solution may alternatively be obtained by pouring the hot solution of polystyrene in tetrachlorodifluoroethane into cold water. The solid solution may also be obtained by cooling the polymer solution to a temperature equal to or slightly below the melting point of the halofluorocarbon solvent. In any event, the solid solution obtained is plastic and pliable and in this particular example, i.e., polystyrene in tetrachlorodifluoroethane, the texture of the solid solution was dough-like. The solid solution may, prior to sublimation, be extruded, molded or shaped into any desired form. In order to hasten sublimation of the halofluorocarbon, means to maintain the temperature of the solid solution in the range of 0–

35° C. may be used, if desired. As is common in most sublimation processes, means to trap solvent vapor such as a cold trap, may also be employed to recover the solvent.

Example 2

Microporous open cellular polystyrene (98% void content).—The void content of the cellular structure may be conveniently and easily varied by varying the concentration of the polymer in halocarbon solution. In order to prepare cellular polystyrene of 98% void content, for example, the hot solution obtained in Example 1 was diluted with 4000 ml. of warm 1,1,1,2-tetrachloro-2,2-difluoroethane and thoroughly mixed. The solid solution and the shaped cellular structure were then obtained as in Example 1. The coherent microporous open cellular structure of polystyrene with 98% void content was white, and was no longer hard but soft and compressible.

Example 3

Microporous open cellular styrene-butadiene-isoprene copolymer (void content 90%).—A 10 (w./v.) solution was prepared by stirring 100 g. styrene-butadiene-isoprene copolymer ("Kraton" 102 Shell Chemical Co.) with 1000 ml. 1,1,1,2-tetrachloro - 2,2 - difluoroethane under reflux until solution was complete. The solid solution and the final coherent microporous cellular structure were obtained essentially as outlined in Example 1 except that sublimation was carried out at a temperature below approximately 25° C. since the solid solution was relatively soft above this temperature. The cellular structure of hydrocarbon elastomer thus obtained was white, microporous and highly elastic.

Example 4

Microporous open cellular ethylene-vinyl acetate copolymer.—A 5% (w./v.) solution was prepared by stirring 50 g. of ethylene-vinyl acetate copolymer ("Alathon" 3170 Du Pont) with 1000 ml. of 1,1,1,2-tetrachloro-2,2-difluoroethane under reflux until solution was complete. The solution was clear and homogeneous. The solid solution and the cellular structures were obtained as outlined in Example 1. The product was a white, coherent microporous open cellular ethylene-vinyl acetate copolymer which was moderately elastic. This product when in thin film (0.001–0.02 inch thick) was white and opaque and was pressure coalescible to a clear transparent film.

Example 5

Microporous open cellular polymethylmethacrylate (90% void content).—A 10% (w./v.) solution was prepared by stirring 100 g. of polymethylmethacrylate ("Lucite" 130 molding pellets, Du Pont) with 1000 ml. of 1,1,1,2-tetrachloro-2,2-difluoroethane under reflux until a clear homogeneous solution was obtained. A solidified solution and the final cellular structure were obtained essentially as in Example 1 except that, since it is often desirable with the polymethylmethacrylate solutions, the solution was rapidly cooled down to below the solidification temperature of the solvent in order to avoid possible separation of some of the polymer from the solution. The microporous coherent open cellular structure of polymethmethacrylate thus obtained was white and somewhat brittle.

Example 6

Microporous open cellular polyvinyl chloride (95% void content).—This example is illustrative of use of auxiliary solvent to bring about dissolution of polymer in halofluorocarbon. A mixture of 50 g. polyvinyl chloride (Eastman "Blacar" 1716), 400 g. USP grade camphor, and 800 g. 1,1,1,2-tetrachloro-2,2-difluoroethane were heated at reflux until a clear solution was obtained. The solid solution and the final cellular structure were obtained as in Example 1. In this particular example, it is clear that tetrachlorodifluoroethane is sublimed readily while to sublime camphor will require longer time. The microporous coherent open cellular polyvinyl chloride thus obtained is white, and tough.

Example 7

Microporous open cellular ionically cross-linked ethylene methacrylic acid copolymer (90% void content).—This example is illustrative of use of a small amount of auxiliary solvent to dissolve the polymer in halofluorocarbon.

Ethylene-methacrylic acid copolymer partially crosslinked ionically ("Surlyn" 1650 Du Pont) (10 g.), was refluxed with 100 ml. of 1,1,1,2-tetrachloro-2,2-difluoroethane, to which 1–2 ml. of glacial acetic acid had been added, until a clear homogeneous solution was obtained. The solid solution and the final cellular structure were obtained as in Example 1. The microporous coherent open cellular ethylene-methacrylic acid (partially crosslinked) thus obtained was white and somewhat elastic. This product when in thin film (0.001 to 0.02 inch thick) was white and opaque and was pressure coalescible to a transparent film.

Example 8

Microporous open cellular epoxy polyamide (90% void content).—This example illustrates additional condensation reaction being carried out in halofluorocarbon solvent to give cross-linked polymers in the presence of halofluorocarbon which can then be processed to give cellular structure.

10 g. of epoxy resin ("Epon" 826 Shell Chemical Co.) was dissolved in 50 ml. of 1,1,1,2-tetrachloro-2,2-difluoroethane by heating and to the solution was added 5 g. of polyamide ("Versamid" 125 General Mills) to obtain a clear yellow solution. An additional 100 ml. of tetrachlorodifluoroethane was then added and the solution was heated at reflux until a permanent turbidity developed. The solution was then cooled as in Example 1 to give a solid solution. The solid solution was then kept at room temperature for 16–20 hours to afford opportunity for the two polymer components to react further. It is desirable during the room temperature storage period to take steps to minimize loss of chlorofluorocarbon by evaporation—this can be accomplished by wrapping with impermeable membrane. The solid solution was then placed in a vacuum desiccator as in Example 1 and the halofluorocarbon solvent removed by sublimation. The microporous coherent open cellular epoxy-polyamide thus obtained was light yellow and had retained the shape and the dimensions of the original solid solution. This material may be cut, sawed or drilled. If desired, addition post-curing of the cellular structure may be carried out by heating at 100° C. without detectable shrinkage.

Example 9

Microporous open-cellular polychloroprene (~60% void content).—This example illustrates uniform loading of solids in cellular structure. In this instance curing components of raw polychloroprene are loaded in the cellular structure and curing is then carried out on cellular raw polychloroprene.

20 g. uncured polychloroprene ("Neoprene" Raw Du Pont) was dissolved in 200 ml. of a 95:5 mixture of 1,1,2,2-tetrachloro-1,2-difluoroethane and 1,1,1,2-tetrachloro-2,2-difluoroethane by heating. To a 25 ml. portion of this solution, 1 g. of standard curing mixture was added and uniformly dispersed. The curing mixture contained the following ingredients:

| | Parts |
|---|---|
| Phenyl-α-naphthylamine | 1 |
| Magnesium oxide | 4 |
| SF carbon black | 35 |
| Zinc oxide | 5 |
| Ethylene thiourea | 0.35 |

The solution with uniformly distributed solid particles was then poured into rod-shaped mold and chilled to obtain rod-shaped solidified solution. This rod-shaped solidified solution thus obtained was then placed in a vacuum desiccator and the chlorofluorocarbon solvent sublimed away as in Example 1. The resulting cellular material was gray-black in color, microporous and rather soft, retaining the rod-shape in the same dimension. This cellular rod was then placed in an oven at 150–155° C. for 30 minutes at which time it was converted to a black, tough, rubbery, porous rod. During the curing reaction, shrinkage of approximately 30% occurred giving a net void content of the final cured microporous polychloroprene of approximately 60%.

Versatility of present invention is demonstrated further in the preparation of laminated cellular structures. Preparation of laminated cellular structures by prior art methods involved first the preparation of individual cellular structures and then forming a laminate by adhesively binding one cellular structure to another. In contrast, the process of present invention provides a simple procedure for forming laminated cellular structures. In one procedure, solutions of polymers in chlorofluorocarbon may be successively frozen on top of each other and the resulting layered solid solution converted to cellular structure. An alternative procedure would be to layer one solid solution on top of another and then convert the layered solid solution into cellular structure. This second procedure is possible only because the solid solutions of the polymers in chlorofluorocarbon of this invention are plastic, pliable and malleable.

Example 10

Microporous cellular laminate of polystyrene, polymethylmethacrylate, polyvinylacetate and ethylene-vinylacetate copolymer.—Individual solutions of polystyrene (10% (w./v.)), polymethylmethacrylate (10% (w./v.)), and ethylene-vinylacetate copolymer (5% (w./v.)) in 1,1,1,2-tetrachloro-2,2-difluoroethane were prepared as in Examples 1, 5 and 4. A 10% solution of polyvinylacetate in the same solvent was prepared by the same procedure as in Example 1 above. In the first method of making a laminated cellular structure from these polymers, a portion of polystyrene solution was poured into a cylindrical mold which was then cooled in ice-water bath. When the polystyrene solution had solidified, a portion of polymethylmethacrylate solution was poured in on top of the solidified polystyrene solution. Upon solidification of polymethylmethacrylate solution, the process was repeated with polyvinylacetate solution. After addition of ethylene-vinylacetate copolymer solution to the mold there was then obtained a cylindrically shaped solid solution which was composed of layers of four different solid polymer solutions. Conversion of this composite solid solution to a cellular structure according to the description in Example 1 gave a coherent, microporous, open cellular structure of the shape and dimensions of the original solid solution.

In an alternative procedure of obtaining laminated cellular structure, each solution described above was individually cooled to form a solidified solution. Since each of the solidified solutions is plastic, pliable and malleable, a laminate of solid solutions was readily prepared by layering one solid solution on top of another. The laminated solid solution was then converted to cellular structure as in Example 1. Thus there was obtained a laminated microporous coherent open cellular structure which had retained the shape and the dimensions of the original laminated solid solution and which was firmly laminated so that no separation of layers took place.

Example 11

Examples 11 and 12 show that either coherent structure or particulate matter may be obtained, depending upon the amount of surface active agent used.

Microporous open cellular polystyrene.—A 10% (w./v.) solution of polystyrene ("Styron" 666, Dow) was obtained by stirring 20 g. of the polymer in 200 ml. of 1,1,1,2-tetrachloro-2,2-difluoroethane under reflux until a clear homogeneous solution resulted. To the solution, 2 g. of isopropyl ammonium salt of dodecylbenzenesulfonate ("Emcol" P10–59 Witco) was then added followed by 50 ml. of hot water. With vigorous stirring a viscous emulsion was obtained which had no visible separate water phase. Upon cooling to a temperature below 40° C. (solidification temperature of halofluorocarbon used), a stiff malleable dough-like solid emulsion was obtained, again with no visible separate water phase. A portion of the dough-like solid emulsion was then rolled out to yield a uniform, white sheet approximately 50 mils thick. This was trimmed to fit a Büchner funnel, placed in the funnel and a vacuum was applied (50–100 mm. Hg pressure). Water was immediately sucked into the filter flask, followed by sublimation of halofluorocarbon solvent. There was obtained a white, permeable microporous sheet of polystyrene.

Example 12

Microporous particulate open cellular polystyrene.—A 10% (w./v.) solution of polystyrene ("Styron" 666, Dow) was obtained by stirring 20 g. of the polymer in 200 ml. of 1,1,1,2-tetrachloro-2,2-difluoroethane under reflux until a clear homogeneous solution resulted. To the solution 3 g. of octyl phenoxypolyethoxyethanol ("Triton" X–100 Rohm and Haas) was then added followed by 100 ml. of hot water added with vigorous stirring to obtain a thick white emulsion. Upon cooling to a temperature below the solidification temperature of the halofluorocarbon (40.6° C.), a white dough-like solid emulsion similar to that of Example 11 was obtained. When this dough-like solid emulsion was placed in a Büchner funnel and aspirated as in Example 11, the resultant product was a white, fluffy, microporous powder.

Example 13

Microporous, particulate, open cellular polymethylmethacrylate.—When a solution of polymethylmethacrylate ("Lucite" 130 Du Pont) prepared as in Example 5 was carried through the steps described in Example 12, microporous, particulate, open cellura polymethylmethacrylate was readily obtained.

Example 14

Microporous particulate open cellular polyethylene.—A solution of polyethylene ("Alathon" 10 Du Pont) was prepared by heating at reflux a mixture of 25 g. polyethylene, 200 g. camphor, and 500 ml. of 1,1,1,2-tetrachloro-2,2-difluoroethane until a clear solution was obtained. To a 200 ml. portion of this solution, 3 g. of "Triton" X–100 were added followed by 100 ml. of hot water with vigorous agitation to obtain a white emulsion. Cooling of this emulsion to a temperature below the solidification temperature of the chlorofluorocarbon solvent (40.6° C.) gave a white dough-like solid emulsion similar to that of Example 12. Aspiration of this dough-like solid emulsion on a vacuum filter flask yielded a white powder which was microporous, particulate, open cellular polyethylene. In the aspiration step, water was immediately removed from the dough into the filter flask, followed by removal of camphor again by sublimation. The removal of camphor takes appreciably longer time because of the lower vapor pressure.

As mentioned previously, the solid solution of polymer in chlorofluorocarbon solvent and the solidified emulsion of a solution of polymer in chlorofluorocarbon and water are plastic and pliable and thus can be formed into any desired shape. It has also been mentioned that upon removal of the solvent from the solidified solution or solidified emulsion, the resultant cellular structure retains the shape and the dimension of the original shape. The nature of the above solid solutions and solidified emulsion is such that it is possible to orient polymer particles under shear. The orientation is retained in the final cellular structure so that the final structure appears fibrous and is heat shrinkable.

Example 15

Oriented microporous coherent open cellular polystyrene.—A portion of the solidified emulsion of Example 11 was pressed and rolled uniaxially into a thin sheet. The sheet was then converted into a cellular structure as in Example 1 or Example 11. The resultant cellular structure possessed a fibrous structure which appears as if it were composed of fibers of short lengths oriented in the direction of rolling. When a portion of the sheet was immersed in hot water (70° C.), shrinkage principally in the direction of original rolling took place.

The coherent open-celled polymeric structures made by the process of the present invention can be used in many applications such as insulating materials in areas of low humidity and low internal pressures; in poromeric materials in which vapor penetration is important, e.g., as a heat-insulating layer of a synthetic shoe-upper material; in synthetic sponges and other articles which must be able to absorb large quantities of water or other liquids; and in specialty filters.

The particulate open-celled polymeric structures made by the process of the present invention can find application in areas where highly absorbent, large surface area powders are used. These applications include: materials for column, gas and thin layer chromatography; desiccating powders; and filtration adjuvants.

This detailed description has been given for clarity of understanding only and no unnecessary limitations are to be understood therefrom. The invention is not limited to exact details shown for obvious modifications will occur to one skilled in the art.

The embodiments in which an exclusive property or privilege is claimed are defined as follows:

1. A process for preparing microporous, open-celled cellular polymeric structures which comprises:
    (a) dissolving at least 0.3 gram per 100 ml. of solvent of a normally solid polymer in a solvent comprising a liquid chlorofluorocarbon or mixture of chlorofluorocarbons having a boiling point in the range of from about 10° C. to 150° C., a melting point in the range of about —40° C. to 125° C., an entropy of fusion of less than 10 calories/° K/mole, a plastic flow index of at least 0.1 g./10 min. at the reduced temperature of 0.96 to 0.99, and a solubility in water of less than about 2 weight percent to form a polymer solution, said polymer having a solubility of at least 0.3 gram per 100 ml. in said solvent;
    (b) cooling the said polymer solution to at least the solidification temperature of the lowest melting chlorofluorocarbon present to form a solidified solution;
    (c) removing the solvent from the said solidified solution at a temperature equal to or lower than the solidification temperature of the lowest melting chlorofluorocarbon present.

2. A process according to claim 1 wherein the chlorofluorocarbon or mixture of chlorofluorocarbons is selected from the group consisting of 1,1,1,2,2-pentachloro-2-fluoroethane,
1,1,2,2-tetrachloro-1,2-difluoroethane,
1,1,1,2-tetrachloro-2,2-difluoroethane,
1,1,1-trichloro-2,2,2-trifluoroethane,
1,2-dichlorodecafluorocyclohexane,
1,1,2,2-tetrachloro-perfluorocyclobutane,
1,2-dichloroperfluorocyclobutane,
1-chloroperfluorocyclobutane,
1,1,2-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane and mixtures thereof.

3. A process according to claim 1 wherein the solvent of claim 1(a) comprises additionally an adjuvant selected from the group consisting of camphor, p-dichlorobenzene, acetic acid, trioxane and methylethyl ketone, the amount of said adjuvant present being less than that which would depress the solidification temperature of the polymer solution more than from about 5–10° C. below the solidification temperature of the chlorofluorocarbon itself.

4. A process according to claim 1 wherein from 0.3 to about 50 grams per 100 ml. of solvent of a normally solid polymer is dissolved in the solvent.

5. A process according to claim 3 wherein from 0.3 to about 50 grams per 100 ml. of solvent of a normally solid polymer is dissolved in the solvent.

6. A process according to claim 1 wherein the solvent is removed from the solidified solution by sublimation.

7. A process according to claim 3 wherein the solvent is removed from the solidified solution by sublimation.

8. A process according to claim 1 wherein the chlorofluorocarbon of claim 1(a) is 1,1,1,2-tetrachloro-2,2-difluoroethane.

9. A process according to claim 1 wherein the chlorofluorocarbon of claim 1(a) is a mixture of 1,1,1,2-tetrachloro-2,2-difluoroethane and 1,1,2,2-tetrachloro-1,2-difluoroethane.

10. A process according to claim 3 wherein the chlorofluorocarbon of claim 1(a) is a mixture of 1,1,1,2-tetrachloro-2,2-difluoroethane and 1,1,2,2-tetrachloro-1,2-difluoroethane.

11. A process for preparing microporous, open-celled cellular polymeric structures which comprises:
    (a) dissolving at least 0.3 gram per 100 ml. of solvent of a normally solid polymer in a solvent comprising a liquid chlorofluorocarbon or mixture of chlorofluorocarbons having a boiling point in the range of from about 10° C. to 150° C., a melting point in the range of from about —40° C. to 125° C., an entropy of fusion of less than 10 calories/° K/mole, a plastic flow index of at least 0.1 g./10 min. at the reduced temperature of 0.96 to 0.99, and a solubility in water of less than about 2 weight percent to form a polymer solution, said polymer having a solubility of at least 0.3 gram per 100 ml. in said solvent;
    (b) adding to said polymer solution an anionic, cationic or nonionic surface active agent;
    (c) adding water to the polymer solution containing the surface active agent at a temperature above the solidification temperature of the highest melting solvent component present to form a mixture;
    (d) agitating said mixture to produce a liquid emulsion;
    (e) cooling the liquid emulsion with continued agitation to at least the solidification temperature of the lowest melting chlorofluorocarbon present thus forming a plastic mass; and
    (f) removing the water and the solvent from said plastic mass, at a temperature greater than 0° C. but equal to or lower than the solidification temperature of the lowest melting chlorofluorocarbon present.

12. A process according to claim 11 wherein the chlorofluorocarbon or mixture of chlorofluorocarbons is selected from the group consisting of 1,1,1,2,2-pentachloro-2-fluoroethane,
1,1,2,2-tetrachloro-1,2-difluoroethane,
1,1,1,2-tetrachloro-2,2-difluoroethane,
1,1,1-trichloro-2,2,2-trifluoroethane,
1,2-dichlorodecafluorocyclohexane, 1,1,2,2-tetrachloro-perfluorocyclobutane,
1,2-dichloroperfluorocyclobutane,
1-chloroperfluorocyclobutane,
1,1,2-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane and mixtures thereof.

13. A process according to claim 11 wherein the solvent of claim 12(a) comprises additionally an adjuvant selected from the group consisting of camphor, p-dichlorobenzene, acetic acid, trioxane and methylethyl ketone, the amount of said adjuvant present being less than that which would depress the solidification temperature of the polymer solution more than from about 5–10° C. below the solidification temperature of the chlorofluorocarbon itself.

14. A process according to claim 11 wherein less than about 1 gram per 100 ml. of solvent of surface active agent is added.

15. A process according to claim 11 wherein greater than about 1 gram per 100 ml. of solvent of surface active agent is added.

16. A process according to claim 11 wherein from about 1 to about 3 grams per 100 ml. of solvent of surface active agent is added.

17. A process according to claim 13 wherein less than about 1 gram per 100 ml. of solvent of surface active agent is added.

18. A process according to claim 13 wherein greater than about 1 gram per 100 ml. of solvent of surface active agent is added.

19. A process according to claim 13 wherein from about 1 to about 3 grams per 100 ml. of solvent of surface active agent is added.

20. A process according to claim 11 wherein the surface active agent is anionic and is selected from the group consisting of fatty carboxylic acids, sulfuric esters, alkanesulfonic acids and alkylarylsulfonic acids.

21. A process according to claim 11 wherein the surface active agent is cationic and is selected from the group consisting of fatty amines and quaternary ammonium compounds.

22. A process according to claim 11 wherein the surface active agent is nonionic and is selected from the group consisting of polyoxyalkylene ethers of higher fatty acids and alkylphenols.

23. A process according to claim 13 wherein the surface active agent is anionic and is selected from the group consisting of fatty carboxylic acids, sulfuric esters, alkanesulfonic acids and alkylarylsulfonic acids.

24. A process according to claim 13 wherein the surface active agent is cationic and is selected from the group consisting of fatty amines and quaternary ammonium compounds.

25. A process according to claim 13 wherein the surface active agent is nonionic and is selected from the group consisting of polyoxyalkylene ethers of higher fatty acids and alkylphenols.

26. A process according to claim 11 wherein from 0.3 to about 50 grams per 100 ml. of solvent of a normally solid polymer is dissolved in the solvent.

27. A process according to claim 13 wherein 0.3 to about 50 grams per 100 ml. of solvent of a normally solid polymer is dissolved in the solvent.

28. A process according to claim 11 wherein the chlorofluorocarbon of claim 12(a) is 1,1,1,2-tetrachloro-2,2-difluoroethane.

29. A process according to claim 11 wherein the chlorofluorocarbon of claim 12(a) is a mixture of 1,1,2-tetrachloro-2,2-difluoroethane and 1,1,2,2-tetrachloro-1,2-difluoroethane.

30. A process according to claim 13 wherein the chlorofluorocarbon of claim 12(a) is 1,1,1,2-tetrachloro-2,2-difluoroethane.

31. A process according to claim 13 wherein the chlorofluorocarbon of claim 12(a) is a mixture of 1,1,1,2-tetrachloro-2,2-difluoroethane and 1,1,2,2-tetrachloro-1,2-difluoroethane.

32. A process according to claim 11 wherein the solvent is removed from the plastic mass by aspiration.

33. A process according to claim 13 wherein the solvent is removed from the plastic mass by aspiration.

34. A pliable, solidified solution of a polymer in a selected chlorofluorocarbon prepared by
(a) dissolving at least 0.3 gram per 100 ml. of solvent of a normally solid polymer in a solvent comprising a liquid chlorofluorocarbon or mixture of liquid chlorofluorocarbons having a boiling point in the range of from about 10° C. to 150° C., a melting point in the range of from about −40° C. to 125° C., an entropy of fusion of less than 10 calories/° K/mole, a plastic flow index of at least 0.1 g./10 min. at the reduced temperature of 0.96 to 0.99, and a solubility in water of less than about 2 weight percent to form a polymer solution, said polymer having a solubility of at least 0.3 gram per 100 ml. in said solvent, and
(b) cooling the said polymer solution to at least the solidification temperature of the lowest melting chlorofluorocarbon present to form a solidified solution.

35. A pliable, solidified solution according to claim 34 wherein the chlorofluorocarbon or mixture of chlorofluorocarbons of 34(a) is selected from the group consisting of 1,1,1,2,2-pentachloro-2-fluoroethane,
1,1,2,2-tetrachloro-1,2-difluoroethane,
1,1,1,2-tetrachloro-2,2-difluoroethane,
1,1,1-trichloro-2,2,2-trifluoroethane,
1,2-dichlorodecafluorocyclohexane,
1,1,2,2-tetrachloro-perfluorocyclobutane,
1,2-dichloroperfluorocyclobutane,
1-chloroperfluorocyclobutane,
1,1,2-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane and mixtures thereof.

36. A pliable, solidified solution of a polymer in a selected chlorofluorocarbon prepared by
(a) dissolving at least 0.3 gram per 100 ml. of solvent of a normally solid polymer in a solvent comprising
(i) a liquid chlorofluorocarbon or mixture of chlorofluorocarbons having a boiling point in the range of from about 10° C. to 150° C., a melting point in the range of from about −40° C. to 125° C., an entropy of fusion of less than 10 calories/° K/mole, a plastic flow index of at least 0.1 g./10 min. at the reduced temperature of 0.96 to 0.99, and a solubility in water of less than about 2 weight percent, and
(ii) an adjuvant selected from the group consisting of camphor, p-dichlorobenzene, acetic acid, trioxane and methylethyl ketone, to form a polymer solution, the amount of said adjuvant present being less than that which would depress the solidification temperature of the polymer solution more than from about 5–10° C. below the solidification temperature of the chlorofluorocarbon itself, said polymer having a solubility of at least 0.3 gram per 100 ml. in said solvent; and
(b) cooling the said polymer solution to at least the solidification temperature of the lowest melting chlorofluorocarbon present, to form a solidified solution.

37. A pliable solidified solution according to claim 36 wherein the chlorofluorocarbon or mixture of chlorofluorocarbons of 36(a)(i) is selected from the group consisting of 1,1,1,2,2-pentachloro-2-fluoroethane,
1,1,2,2-tetrachloro-1,2-difluoroethane,
1,1,1,2-tetrachloro-2,2-difluoroethane,
1,1,1-trichloro-2,2,2-trifluoroethane,
1,2-dichlorodecafluorocyclohexane,
1,1,2,2-tetrachloro-perfluorocyclobutane,
1,2-dichloroperfluorocyclobutane,
1-chloroperfluorocyclobutane,
1,1,2-trichloro-1,2,2-trifluoroethane,
1,1,1,3-tetrafluoro-2,2,3,3-tetrachloropropane,
1,1,1,3,3-pentafluoro-2,2,3-trichloropropane,
1,1,1,3,3,3-hexafluoro-2,2-dichloropropane,
1,1,1,4,4,4-hexafluoro-2,2,3,3-tetrachlorobutane
and mixtures thereof.

References Cited
UNITED STATES PATENTS

| | | | |
|---|---|---|---|
| 3,585,149 | 6/1971 | Vassiliades et al. | 260—2.5 B |
| 3,378,507 | 4/1968 | Sargent et al. | 260—2.5 M |
| 3,403,046 | 9/1968 | Schwacke et al. | 117—102 |

FOREIGN PATENTS 2,017,904  11/1970  Germany _____ 260—2.5 M

JOHN C. BLEUTGE, Primary Examiner

W. J. BRIGGS, Sr., Assistant Examiner

U.S. Cl. X.R.

106—122, 190; 161—159, 254; 210—500; 260—2.5 B, 2.5 M, 2.5 HA, 2.5 HB, 2.5 H, 2.5 AE, 2.5 L, 2.5 BD, 18 EP, 23 H, 23 S, 23 XA, 29.6 R, 29.62, 29.6 XA, 30.4 N, 30.4 R, 31.2 R, 33.8 EP, 33.8 F, 33.8 UA, 33.8 UB; 264—46, 49